United States Patent
Adams et al.

[11] Patent Number: 5,498,023
[45] Date of Patent: Mar. 12, 1996

[54] PACKAGING TETHER FOR DRIVER SIDE AIR BAG CUSHION

[75] Inventors: Stephen L. Adams, Liberty; Daniel C. Vine, Layton, both of Utah

[73] Assignee: Morton International, Inc., Chicago, Ill.

[21] Appl. No.: 348,627

[22] Filed: Dec. 2, 1994

[51] Int. Cl.⁶ .................................................. B60R 21/20
[52] U.S. Cl. ............................... 280/728.2; 280/743.1
[58] Field of Search .................. 280/728 R, 743 R, 280/743 A, 728 A, 728 B, 743.1, 743.2, 728.1, 728.2, 728.3, 729

[56] References Cited

U.S. PATENT DOCUMENTS

| | | | |
|---|---|---|---|
| 5,004,266 | 4/1991 | Miller et al. | 280/743 R |
| 5,162,035 | 11/1992 | Baker | 280/743.1 |
| 5,234,227 | 8/1993 | Webber | 280/728 |
| 5,240,282 | 8/1993 | Wehner et al. | 280/728 |
| 5,242,192 | 9/1993 | Prescaro et al. | 280/730 |
| 5,249,825 | 10/1993 | Gordon et al. | 280/743 |
| 5,255,937 | 10/1993 | EmamBakhsh et al. | 280/728 |
| 5,425,551 | 6/1995 | Hawthorn | 280/743.1 |

FOREIGN PATENT DOCUMENTS

| | | | |
|---|---|---|---|
| 53-147341 | 12/1978 | Japan | 280/743 |
| 3-248943 | 11/1991 | Japan | 280/743 R |
| 4-78637 | 3/1992 | Japan | 280/728 B |

Primary Examiner—Karin L. Tyson
Attorney, Agent, or Firm—A. Donald Messenheimer; Gerald K. White

[57] ABSTRACT

A packaging strap or tether for a driver side air bag cushion is integral with the material of the air bag and attached at opposite ends to a studded ring to retain the air bag in its folded condition during initial assembly and subsequent servicing of the air bag module. Made of a material similar to that of the air bag, the tether must be wide enough to control the folded cushion, but notched at a point along its length to reduce its tensile strength to such an extent that it will break on module deployment without adversely affecting module performance.

10 Claims, 2 Drawing Sheets

5,498,023

PACKAGING TETHER FOR DRIVER SIDE AIR BAG CUSHION

BACKGROUND OF THE INVENTION

1. Field of the invention

This invention relates generally to inflatable type occupant restraint systems for passenger vehicles, or as is more commonly known, an air bag restraint system, and more specifically to a driver side unit that includes a retaining ring and folded air bag subassembly having a packing strap or tether for shipment and storage.

2. Description of Prior Art

An air bag system typically includes a module, which is connected to an inflator and part of the air bag, and a cover which conceals the module from view. Driver side air bags are traditionally mounted as part of the steering wheel and frequently have a studded annular retaining ring to which the air bag is attached as a subassembly.

In the foregoing type of unit, there is a need to handle the folded air bag after attachment to the retaining ring before final installation of the folded air bag in the complete assembly. Also if the module cover is removed to allow servicing of the horn switch or other parts in the steering column or during cover replacement, special care is required to maintain the air bag cushion in its folded state.

SUMMARY OF THE INVENTION

An object of the invention is to provide a novel packaging strap or tether for retaining the air bag in its folded condition during initial assembly and subsequent servicing and which is inexpensive to provide.

In its preferred form, the packaging strap is attached at its opposite ends to bridge across and secure the folded air bag to its attached retaining ring. The strap or tether can be either an extension of the air bag material or it can be made out of another material and sewn integrally to the material of the air bag to be between the retaining ring and a back panel.

After an air bag cushion has been mated with the studded retaining ring and folded, the tether is extended over the folded air bag and held in place by the retaining ring studs. The tether is wide enough to control the folded air bag cushion, but notched or perforated at some point along its length to reduce its tensile strength to a point that it will break on module deployment without affecting module performance.

Other features and advantages will become apparent from a perusal of the detailed description and from the appended drawings.

DETAILED OF PREFERRED EMBODIMENT

Figure 1:
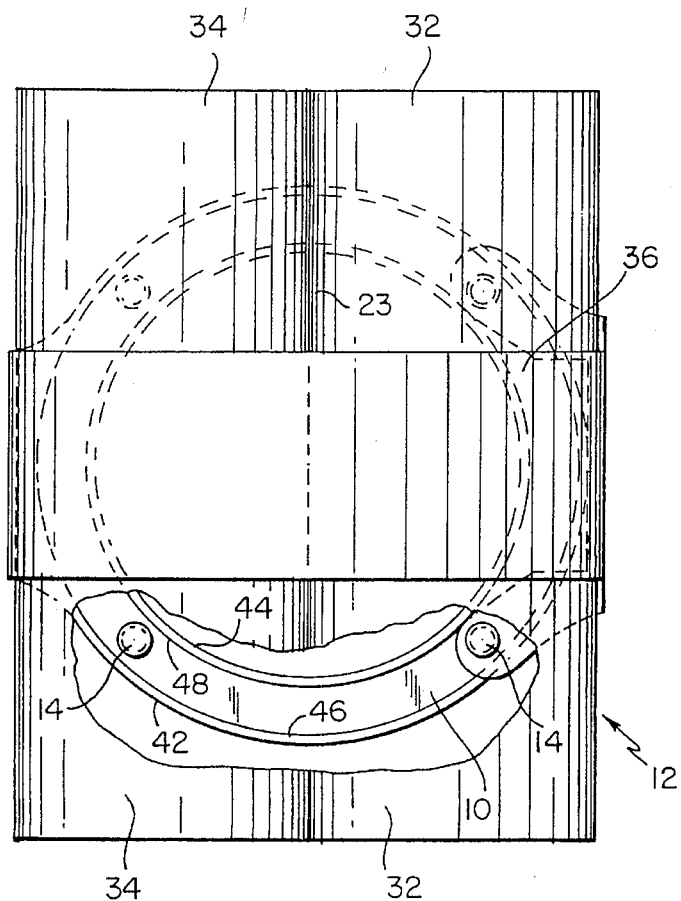
FIG. 1 is a top plan view with part of the air bag removed to show the annular retaining ring and air bag subassembly according to the invention.
Figure 2:
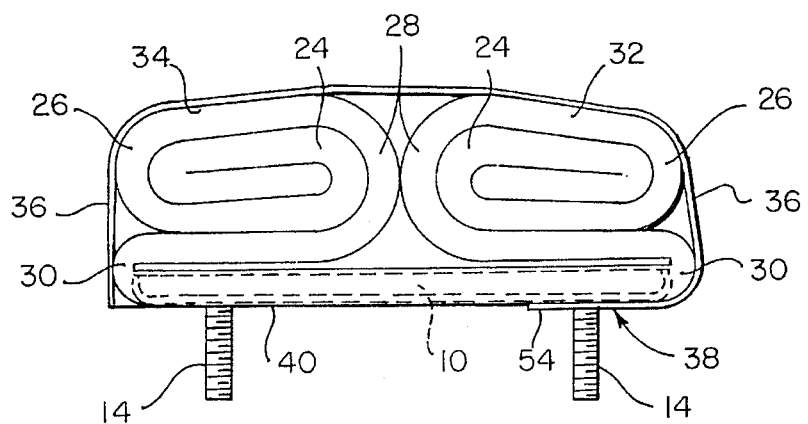
FIG. 2 is a front elevation of the subassembly of FIG. 1 showing the tether in a position extending over the folded air bag and attached at its opposite ends to the annular ring.
Figure 3:
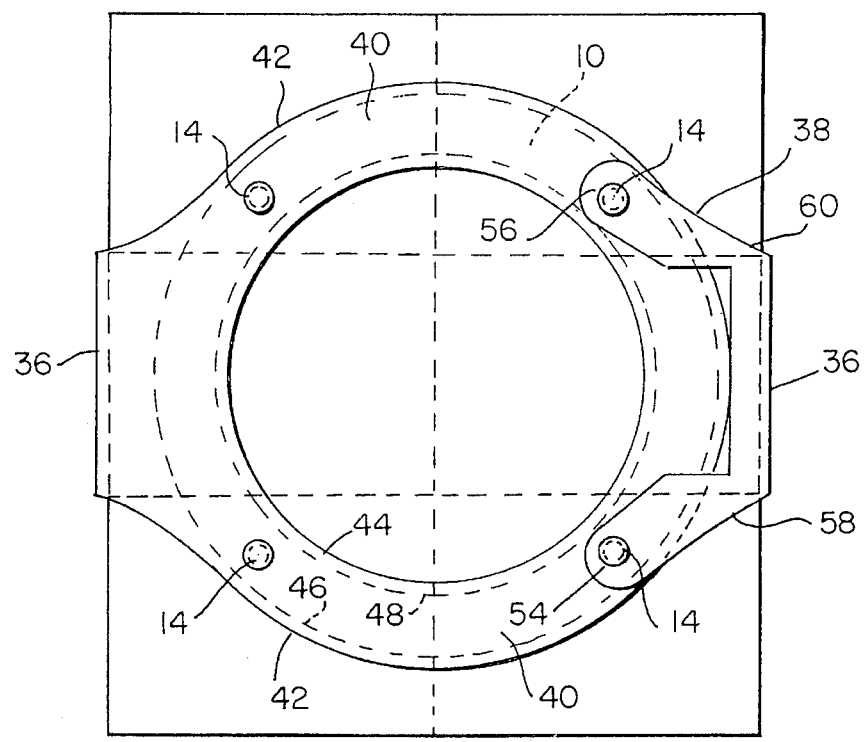
FIG. 3 is a bottom view of the subassembly of FIGS. 1 and 2.

With reference to FIGS. 1–3, the subassembly of the present invention includes a conventional metal retainer ring 10 that may be circular to conveniently fit on a conventional steering wheel hub and a folded air bag 12. As is customary, the air bag is inflatable to become a cushion at a driver seating position when a gas generator is activated as is contemplated in the event of a collision. Ring 10 has four studs 14 that conventionally extend from one face of the retainer ring 10 and are equally spaced around the ring 10 for attachment to an air bag module, not shown.

Figure 4:
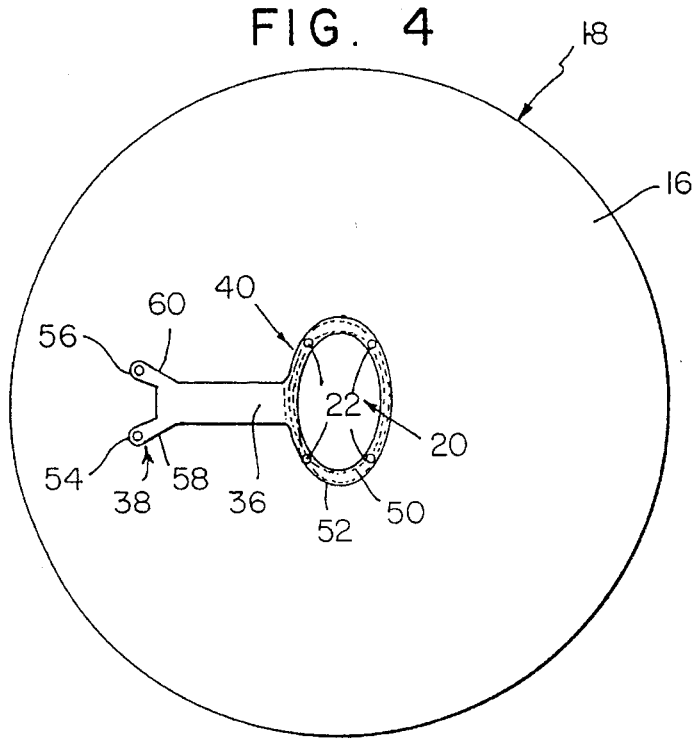
FIG. 4 is a plan view of the air bag to a smaller scale in a flattened condition before folding with the tether integrally attached to the material forming the mouth of the air bag.

One panel 16 of the air bag 12 is usually cut from a sheet of material, see FIG. 4, to have an outer edge 18 that is stitched to a second panel, not shown, to form a chamber into which the inflation gas passes as the air bag cushion is deployed. At the center of the panel 16 illustrated in FIG. 4, a circular opening or mouth 20 is provided which is approximately the same shape and size as the opening in the center of retainer ring 10. The usual practice is to provide a series of holes 22 in the material of the panel which surround the mouth 20 of air bag 12 to be in registration with the studs 14 of retainer ring 10.

One prior method of folding the flat air bag 12 shown in FIG. 4 involves folding each half of the air bag along four parallel fold lines, not shown, that are about 2 or 3 inches (6 cm.) apart. Thereafter, each folded half is again separately folded in a perpendicular direction which is illustrated in FIG. 2. A line 23 has been included in FIG. 1 to identify the separation between the folded bag halves shown in FIG. 2. Each of the folded bag halves which provide abbutting folds on opposite sides of line 23 has four folds 24, 26, 28 and 30. The folded bag is supported on the side of ring which is opposite from the side of the ring from which the studs 14 extend. As the retainer ring 10 and folded bag subassembly is subsequently handled, the outer folded layers are unrestrained and will easily unfold until a front cover, not shown, is added. The front cover is usually a horn cover that is part of the steering wheel.

To prevent undesired unfolding, the present invention provides a packaging strap in the form of a tether 36 which extends in direction substantially perpendicular to the ends of the folds as illustrated in FIG. 2. FIG. 4 shows the tether in its initial flat form. Tether 36 has two end portions 38 and 40. The first end portion 40 is at the mouth 20 of the air bag and is connected to the central portion of tether 36. While tether 36 may be cut from the same sheet of material as panel 16 thus to be extension or unitary part of the panel 16, the tether illustrated is cut from a separate sheet of material and attached as by use of two circular rows of stitching 50 and 52 to be integral with the mouth 20 of the panel 16. The holes 22 also extend through the region between stitch rows 50 and 52 so that the first end 40 of tether 36 is firmly attached to retainer ring 10 with its outer peripheral edge 42 and inner peripheral edge 44 extending beyond the marginal edges 46 and 48 of retainer ring 10.

The width of the central portion of tether 36 should be sufficient to hold the two folded portions having outer surfaces 32 and 34 in place together with retainer ring 10 as the tether 36 is wrapped around the folded bag as illustrated in FIG. 2. The width of the central portion of the tether 36 must be sufficient to control the folded air bag. In one embodiment, the width is less than the diameter of the mouth 20 and for example, may be about 2 inches (5 cm.) so that the subassembly may be handled during manufacture or servicing without letting the air bag unfold. The length of the tether is sufficient to bridge over or extend across the folded air bag. A length of about 8 or 9 inches (22 cm.) has been found to be suitable.

The second free end 38 of tether 36 in a preferred embodiment is somewhat wider than the central portion to engage adjacent ones of studs 14 that are about 3 inches (7.5 cm.) apart as measured in a direction parallel to the width of the central portion of tether 36. Tabs 54 and 56 may be formed by removing material at the end of the tether 36 and holes formed to allow the tabs 54 and 56 to be manually installed over or removed from a corresponding stud 14. The free end of the tether may be formed in other ways to be attachable to at least one stud after the air bag has been folded during manufacture.

It is important that the tether 36 will break on cushion deployment without adversely affecting module performance. Thus, the tether strap should be perforated, notched or otherwise be reduced in width at some point along its length so that its tensile strength is weakened. A preferred technique for providing a weakened section is to choose the size of the cut which forms tabs 54 and 56 to produce necks having very narrow widths, such as about a quarter inch (0.6 cm.) at junctions 58 and 60 between the central body portion and tabs 54 and 56. Upon deployment of air bag 12, the tether 36 breaks at junctions 58 and 60. Until deployment, tether 36 remains as a unitary piece.

From the foregoing, it is apparent that in accordance with the invention there has been provided a packaging strap for permitting a folded air bag to be handled without coming unfolded during the manufacturing operation or during any servicing of that part of the vehicle which contains the installed air bag. At the same time the packaging strap may be made of a material suitable for use with air bag technology and that will not adversely affect module performance.

Based on the foregoing disclosure, it is apparent that modifications and changes may be made without departing from the spirit of the invention. It is not intended that the scope of the invention be limited to the specific embodiments that have been illustrated and described. Rather, it is intended that the scope of the invention be determined by the scope of the claims.

What is claimed is:

1. An air bag subassembly for installation in an air bag cushion module comprising:

an inflatable air bag and annular retainer ring coupled with said air bag, said air bag having a portion defining a fluid opening, said retainer ring being coupled with the portion of the air bag defining the fluid opening to form a mouth of the air bag, said bag being folded to provide ends of two portions each having multiple folds with ends of the folds being generally parallel, each of said portions being on an opposite side of an imaginary line which divides the ring into substantially equal parts, so that the folded bag is essentially the size of the retainer ring and has a predetermined deployment pattern;

a tether having first and second ends, means for securing the first end to the bag at one side of the retainer ring and means for attaching the tether second end to the retainer ring at an opposite side of the retainer, said tether extending in a direction substantially perpendicular to adjacent ends of the folds at said imaginary line to said opposite side of the retainer ring, said tether being made of fabric material, the second end of which is removably attached to a portion extending from the face of the retainer ring on said opposite side of said retained ring thereby to bridge across and retain the folded air bag in its folded condition against the retainer ring, said tether having a central body portion effective width that is sufficient to hold the folded air bag against the retainer ring during initial assembly and subsequent servicing of the air bag cushion module when removed from its installed position; and said tether having a portion which releases due to inflation gas pressure during cushion deployment at a time and in a manner such that said predetermined deployment pattern remains essentially unchanged.

2. An air bag subassembly as defined in claim 1 wherein one end of the tether is integral with material forming the air bag mouth and firmly attached to the retainer ring and the other tether end is free until secured to the retainer ring.

3. An air bag subassembly as defined in claim 2 wherein the tether is an extension of the material used in forming a panel of the air bag.

4. An air bag subassembly as defined in claim 2 wherein the tether is made of a piece of material that is different from that used for the air bag and said one tether end is sewn to be integral with the air bag material.

5. An air bag assembly for installation in an air bag cushion module comprising;

an inflatable air bag and annular retainer ring coupled with said air bag, said air bag having portion defining the fluid opening, said retainer ring being coupled with the portion of the air bag defining the fluid opening to form a mouth of the air bag, said air bag being folded to be essentially the size of the retainer ring;

a tether attached at opposite sides of said retainer ring and bridging across and retaining the folded air bag in its folded condition against said retainer ring, said tether having a central body portion effective width that is sufficient to hold the folded air bag against the retainer ring during initial assembly and subsequent servicing of the air bag cushion module;

one end of the tether being integral with the material forming the air bag mouth and firmly attached to the retainer ring and the other end being free until secured to the retainer ring;

said tether having a portion which has a weakened tensile strength that breaks due to inflation gas pressure during cushion deployment without adversely affecting module performance;

said retainer ring having a circular shape and at least two spaced studs with the studs being spaced apart by about 90 degrees on opposite sides of the tether when the tether central body portion bridges across the folded air bag to retain the air bag in its folded condition; and said other tether end being bifurcated to have two spaced tabs with an aperture in each tab surrounding a respective one of said studs.

6. An air bag subassembly as defined in claim 5 wherein the weakened portion of the tether is formed at the junction of the tabs and the central body portion of the tether.

7. An air bag assembly for installation in an air bag cushion module comprising;

an inflatable air bag and annular retainer ring coupled with said air bag, said air bag having a portion defining the fluid opening, said retainer ring being coupled with the portion of the air bag defining the fluid opening to form a mouth of the air bag, said air bag being folded to be essentially the size of the retainer ring;

a tether attached at opposite sides of said retainer ring and bridging across and retaining the folded air bag in its folded condition against said retainer ring,.said tether having a central body portion effective width that is sufficient to hold the folded air bag against the retainer ring during initial assembly and subsequent servicing of the air cushion module;

said tether having a portion which has a weakened tensile strength that breaks due to inflation gas pressure during cushion deployment without adversely affecting module performance;

the annular retainer ring having a circular shape and carries at least two studs that are spaced apart by about 90 degrees; and one end of the tether being bifurcated to have two spaced ends with an aperture in each tab end surrounding a respective one of said studs.

8. A packaging tether for a driver side air bag cushion module, said tether being part of a subassembly comprised of a circular retainer ring having a plurality of spaced studs extending from one surface of said ring and an inflatable air bag positioned thereon, said air bag having a portion defining a fluid opening, said retainer ring being coupled with the portion defining the fluid opening to form a mouth of the air bag, said air bag being folded and positioned against a surface of said retainer ring that is opposite said one surface;

said tether having opposite ends attached to said retainer ring and extending across the folded air bag with a central portion width sufficient to provide control of the folded air bag material after the time of the fold with one tether end being integrally attached to material forming the mouth of the air bag and the other tether end having spaced tabs with an aperture in each tab that fits over one of two adjacent studs; and a portion having an effective reduced width at some point along the tether length to reduce the tensile strength of the tether to a point that the tether will break on cushion deployment without adversely affecting module performance.

9. A packaging tether as defined in claim 8 that is cut from the material forming the air bag to be constructed integrally with the mouth of the air bag.

10. A packaging tether as defined in claim 8 that is formed from a sheet of material that is distinct from the material used to form the air bag and is sewn integrally with the material that forms the air bag mouth.

* * * * *